Figure 1:
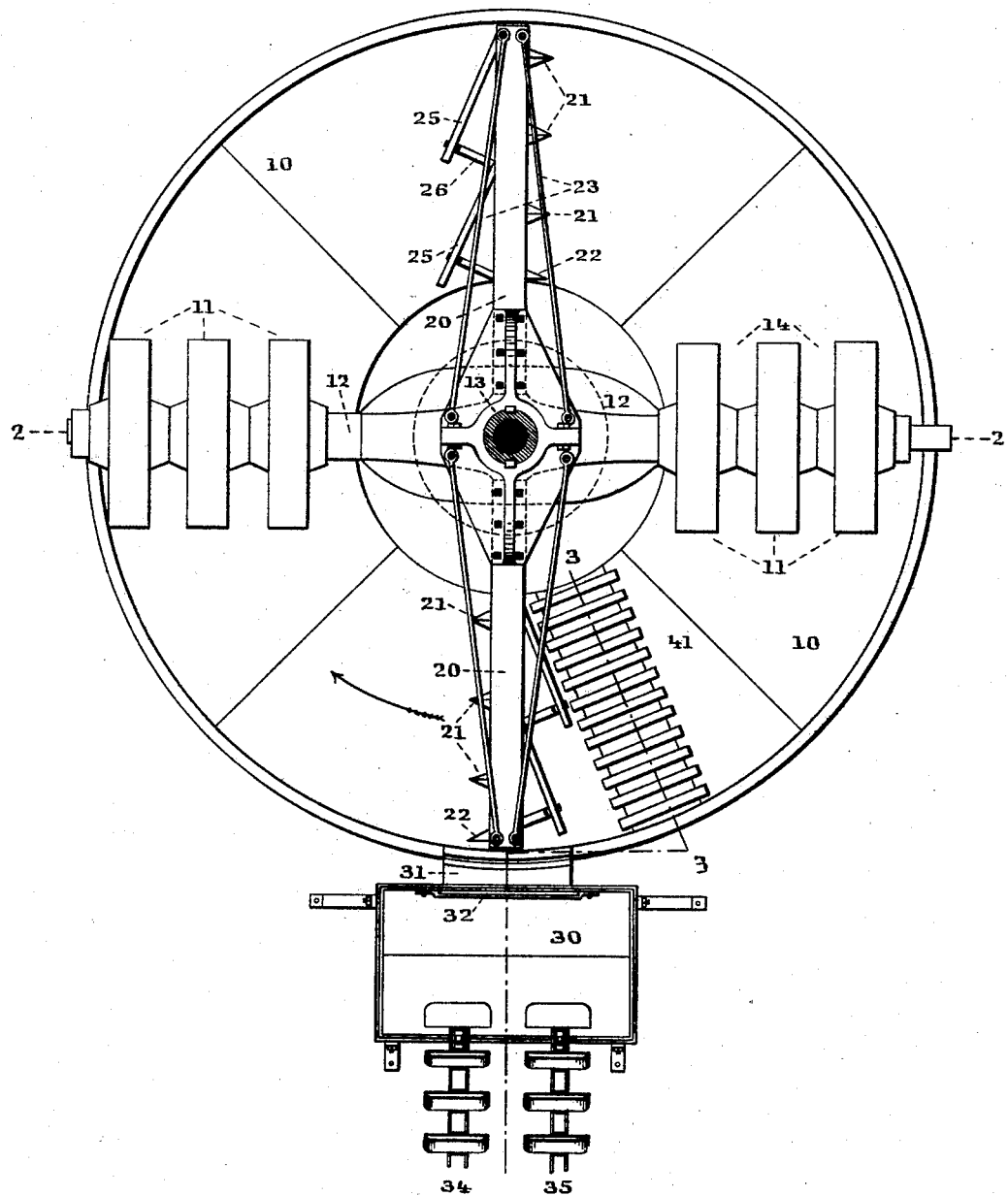

(No Model.) 3 Sheets—Sheet 1.

S. B. LADD.
MORTAR MILL.

No. 524,683. Patented Aug. 14, 1894.

Witnesses
W. R. Edelin.
Oliver H. Bailey.

Inventor.
S. B. Ladd,

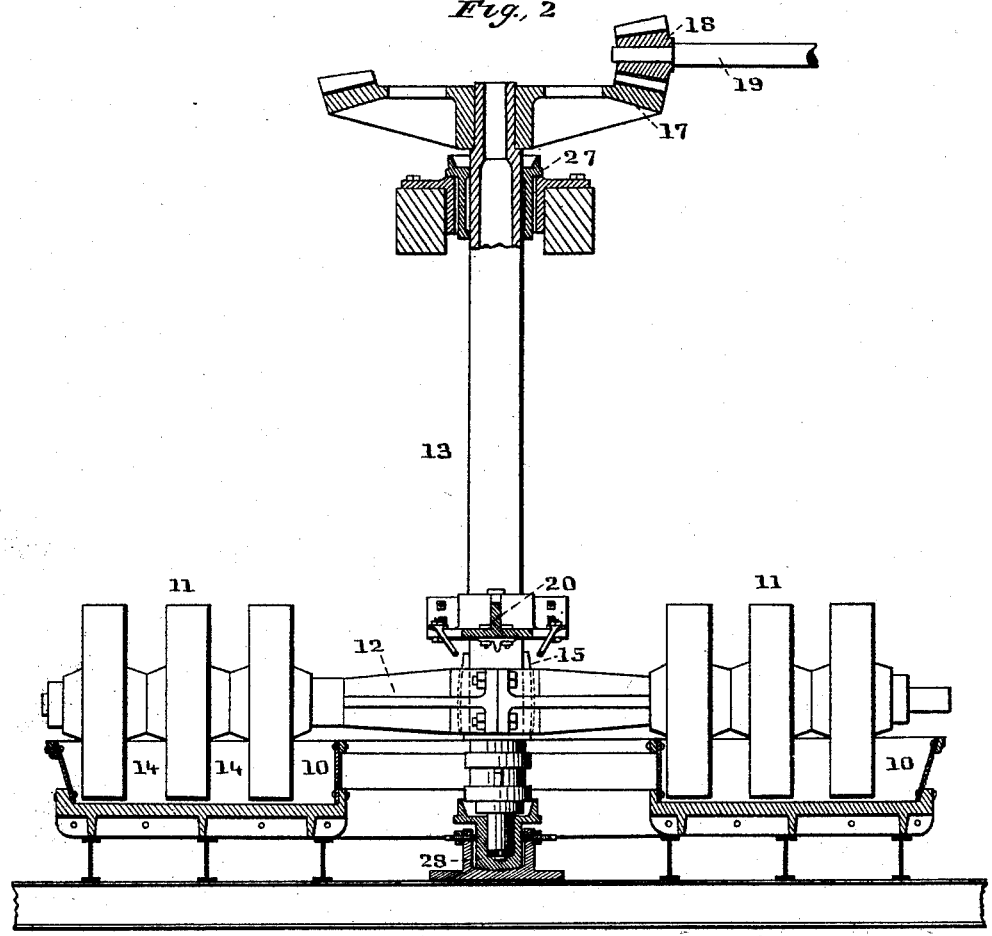

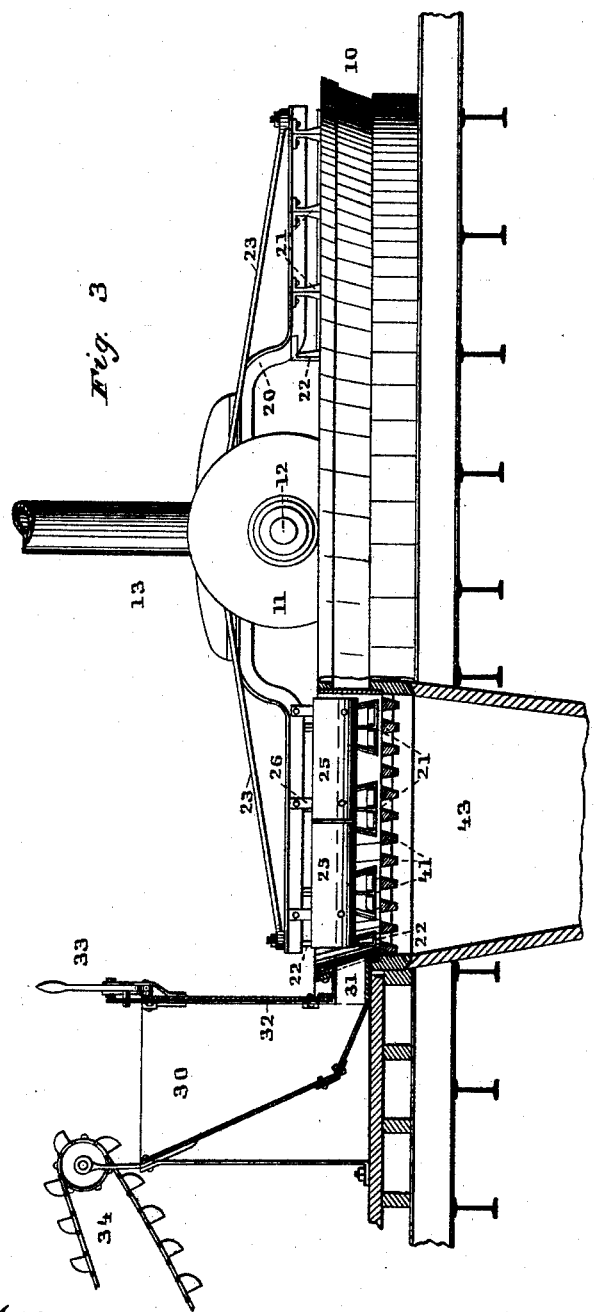

United States Patent Office.

STORY B. LADD, OF WASHINGTON, DISTRICT OF COLUMBIA, ASSIGNOR OF ONE-HALF TO GEORGE HUGHES, OF SAME PLACE.

MORTAR-MILL.

SPECIFICATION forming part of Letters Patent No. 524,683, dated August 14, 1894.

Application filed March 21, 1894. Serial No. 504,492. (No model.)

*To all whom it may concern:*

Be it known that I, STORY B. LADD, a citizen of the United States, residing at Washington, in the District of Columbia, have invented certain new and useful Improvements in Mortar-Mills; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

The object of the present invention is to provide a mill for the grinding and mixing of plastic material, as for example mortar, which shall be continuous in its operation, that is have a continuous feed and continuous discharge, and which shall also grind the materials, as well as knead or mix them; and this result I secure by means of an annular grinding pan or trough having continuously revolving appliances for grinding and mixing the material; said pan having means for continuously feeding the raw material onto the floor of the pan at a certain point, and also a free discharge of all material from the floor of the pan at a point just behind the feeding point; so that the raw material, under the action of the rollers and plows or other devices, travels, in a steady flow, from the point of entrance around to the point of discharge, where all the material is freely discharged in a properly mixed condition. Thus it will be seen that, when the mill is in operation, there is a steady flow of material in progressive stages of manufacture, from the raw material at the point of entrance, to the finished product at the point of discharge.

The invention further consists of certain details of construction and arrangement all of which will be fully described and then pointed out in the claims.

In the accompanying drawings: Figure 1 is a plan view of a mill embodying the features of the present invention. Fig. 2 is a sectional view of the same taken on the line 2—2; and Fig. 3 is a view partly in section and partly in elevation, the section being taken on the broken line 3—3—3.

The grinding and mixing pan, 10, is of annular form, in which there travel two gangs of rollers, 11, 11, loosely mounted on a horizontal shaft 12, which shaft is carried by the central vertical shaft 13. In the present case there are three rollers in each gang, set with the spaces, 14, therebetween, a little narrower than the width of one of the rollers, 11; and the outer roller of one of the gangs travels close to the outer rim of the annular pan, while the inner roller of the other gang travels close to the inner rim of the annular pan, the rollers of one gang traveling over the ground represented by the spaces between the rollers of the other gang.

The horizontal shaft 12, carrying the gangs of rollers, is connected to a vertical shaft, 13, by the spline or feather 15, which admits of the shaft 12 rising and falling on the driving shaft, in order that the rollers can rise sufficiently to pass over any obstruction or accumulation of material in the pan. The outer edges of the splines, 15, have a slight curvature in a vertical plane to allow for the free lifting of one end of the shaft sufficiently to permit the rollers to travel easily.

Above the roller shaft 12, there is a horizontal beam 20, at right angles to the roller shaft, rigidly keyed to the vertical shaft 13, and deflected downward at the ends, over the runway of the pan. This beam carries at each end a set of plows, 21, equal in number to the rollers, and also a side plow or scraper 22. The plows 21, are set so as to follow in the spaces between the rollers of the gang immediately preceding them and cut through the middle of the ridges left in the material to be mixed by the gang of rollers in advance of them. The action of a gang of rollers is to force the material ahead to a certain extent, and to crowd it outward and into the open spaces between them, leaving the semi-plastic material in ridges; and the gang of plows, following a gang of rollers, are set so as to cut through these ridges and turn the material over to either side. The side scraper, 22, carried by one arm of the cross beam is set close to the outer edge of the pan, and that carried by the other arm of the beam is close to the inner edge, so as to turn the material at the sides into the path of the rollers following.

The ends of the plow beam are dropped in the manner shown so as to bring the plows down to the level of the pan and yet permit the beam to be attached to the center shaft above the roller shaft. The brace rods 23 support and strengthen the ends of the plow beam.

Attached to each end of the plow beam, in the rear of each gang of plows, there is a pair of adjustable leveling scrapers 25, projecting obliquely rearward from the plow supporting beam and supported at their rearward ends by the brackets 26. These leveling scrapers are set at some distance above the floor of the pan, and are only designed to cut the tops of the ridges and level the material off. The scraper blades on one side are set at such an angle as to force the material outward, toward the outer rim of the pan; while on the other side the blades are set so as to scrape the material, that is high enough for them to reach, inward toward the center of the pan.

The action of the rollers, plows and leveling scrapers is as follows: First the rollers, crushing and grinding, the material leaves it in ridges. Then the plows cut through these ridges and turn the material over still leaving it in furrows, unless it is sufficiently plastic to settle level, and the leveling scrapers following force the tops of the ridges over into the furrows and leave the material essentially level for the action of the gang of rollers following.

The driving shaft, 13, has a large gear, 17, driven by the pinion, 18, on the power shaft, 19. It is properly supported by the bearing, 27, and the step 28.

The feed hopper is shown at 30; the same having a discharge spout, 31, delivering the raw material onto the floor of the pan. 32 is a gate for the hopper with handle 33, and 34 and 35 are bucket elevators for the sand and lime, or other raw material, delivering the same in measured quantities into the hopper.

The arrow indicates the direction in which the gangs of rollers and plows revolve. In the floor of the pan behind the feed hopper, or in other words just before reaching the mouth of the supply hopper, when following the course of the rollers and plows, there is a discharge opening extending entirely across the annular pan from the inner to the outer edge thereof, and bridged by the steel bars 41, said bars being flush with the floor of the pan. 43 is a chute through which the material is discharged. This grated opening is not designed to be a griddle, or screen, which shall only allow material of a certain size to pass through, but the openings between the bars are large enough to permit all material to pass through that reaches them and to clear the floor of the pan. The grate bars are simply for the purpose of bridging the opening in order that the rollers can pass over the same.

Having thus described my invention, what I claim as new is—

1. In a mill for plastic material, an annular pan having a feed delivering the raw material into the pan at a certain point, and a free discharge opening for all material from the floor of the pan behind the feeding point, in combination with rollers revolving therein, as and for the purpose set forth.

2. In a mill for plastic material, an annular pan having a feed delivering the raw material into the pan at a certain point, and a series of discharge openings in the floor of the pan extending across the annular channel behind the feeding point, in combination with a gang of rollers revolving in the pan, substantially as and for the purpose set forth.

3. In a mill for plastic material, an annular pan having a feed delivering the raw material into the pan at a certain point, and a free discharge opening for all material from the floor of the pan behind the feeding point, in combination with a center shaft having a horizontal shaft vertically movable thereon with gangs of rollers carried by said horizontal shaft, and a plow beam fixed to the vertical shaft and carrying gangs of plows, substantially as and for the purpose set forth.

4. In a mill for plastic material, an annular pan having a feed delivering the raw material into the pan at a certain point, and a free discharge opening for all material from the floor of the pan behind the feeding point, in combination with a center shaft having a horizontal shaft vertically movable thereon with gangs of rollers carried by said horizontal shaft, and a plow beam fixed to the vertical shaft and carrying gangs of plows, together with obliquely inclined leveling blades behind the gangs of plows, substantially as and for the purpose set forth.

5. In a mill for plastic material an annular pan having a feed hopper, and a series of discharge openings in the floor of the pan extending across the annular channel behind the feed hopper, in combination with a center shaft, a horizontal shaft vertically movable on the center shaft and carrying at each end a gang of rollers, and a plow beam fastened to the center shaft above the horizontal shaft and with each end deflected downward and carrying a gang of plows, substantially as and for the purpose set forth.

In testimony whereof I affix my signature in presence of two witnesses.

STORY B. LADD.

Witnesses:
OLIVER W. BAILEY,
THOS. S. HOPKINS.